United States Patent [19]

Sugishima

[11] Patent Number: 4,788,599
[45] Date of Patent: Nov. 29, 1988

[54] IMAGE PROCESSING WITH IMAGE-SLANT CONTROL AND/OR IMAGE-SIZE CONTROL

[75] Inventor: Kiyohisa Sugishima, Yokohama, Japan

[73] Assignee: Canon Kabushiki Kaisha, Tokyo, Japan

[21] Appl. No.: 32,012

[22] Filed: Mar. 30, 1987

[30] Foreign Application Priority Data

Apr. 1, 1986 [JP] Japan .................................. 61-75146
Feb. 13, 1987 [JP] Japan .................................. 62-31193

[51] Int. Cl.$^4$ .............................................. H04N 1/21
[52] U.S. Cl. ..................................... 358/296; 382/44
[58] Field of Search ............... 358/294, 296, 298, 300; 382/41, 42, 43, 44, 45, 46, 47

[56] References Cited

U.S. PATENT DOCUMENTS

| | | | |
|---|---|---|---|
| 4,059,833 | 11/1977 | Kitamma et al. | 346/108 |
| 4,303,948 | 12/1981 | Arai et al. | 358/287 |
| 4,417,805 | 11/1983 | Kishi | 355/14 R |
| 4,470,074 | 9/1984 | Yamada | 358/287 |
| 4,562,485 | 12/1985 | Maeshima | 358/296 X |
| 4,597,051 | 6/1986 | Beausoleil et al. | 358/296 X |
| 4,618,991 | 10/1986 | Tabata et al. | 382/46 |
| 4,637,057 | 1/1987 | Kermisch | 382/46 |
| 4,661,987 | 4/1987 | Anderson et al. | 382/41 |
| 4,672,464 | 6/1987 | Shida | 382/47 X |
| 4,679,155 | 7/1987 | Mitsuka | 382/47 X |

FOREIGN PATENT DOCUMENTS 2057222 3/1981 United Kingdom .

*Primary Examiner*—Clifford C. Shaw
*Attorney, Agent, or Firm*—Fitzpatrick, Cella, Harper & Scinto

[57] ABSTRACT

An image processing apparatus reads an image of an original line by line and to inputs the read image signal line by line and stores the input image signal in a memory controller changes the read-out position of the image signal from the memory, for read-out line by line or on in units of a few lines. A setting circuit sets an amount of slant of an image to be output, for image formation circuit on a selected recording material. The controller controls the reading position of the image signal of the memory in accordance with the set slant amount. With this image processing apparatus, the original image can be easily modified, shifted, and rotated and also recorded on a recording sheet line by line or in units of a few lines by simple operations.

21 Claims, 14 Drawing Sheets

| ANGLE° | THE NUMBER OF LINES | THE NUMBER OF MOVEMENT DOTS EVERY LINE ||||||||||||||| 
|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 |
| 85° | 1 | 11 | | | | | | | | | | | | | | |
| 80 | 2 | 5 | 6 | | | | | | | | | | | | | |
| 75 | 4 | 3 | 4 | 4 | 4 | | | | | | | | | | | |
| 70 | 4 | 2 | 3 | 3 | 3 | | | | | | | | | | | |
| 65 | 7 | 2 | 2 | 2 | 2 | 2 | 2 | 3 | | | | | | | | |
| 60 | 4 | 1 | 2 | 2 | 2 | | | | | | | | | | | |
| 55 | 7 | 1 | 1 | 2 | 1 | 2 | 1 | 2 | | | | | | | | |
| 50 | 5 | 1 | 1 | 1 | 1 | 2 | | | | | | | | | | |
| 45 | 1 | 1 | | | | | | | | | | | | | | |
| 40 | 6 | 0 | 1 | 1 | 1 | 1 | 1 | | | | | | | | | |
| 35 | 10 | 0 | 1 | 1 | 0 | 1 | 1 | 0 | 1 | 1 | 1 | | | | | |
| 30 | 7 | 0 | 1 | 0 | 1 | 0 | 1 | 1 | | | | | | | | |
| 25 | 15 | 0 | 0 | 1 | 0 | 1 | 0 | 1 | 0 | 1 | 0 | 1 | 0 | 1 | 0 | 1 |
| 20 | 11 | 0 | 0 | 1 | 0 | 0 | 1 | 0 | 0 | 1 | 0 | 1 | | | | |
| 15 | 15 | 0 | 0 | 0 | 1 | 0 | 0 | 0 | 1 | 0 | 0 | 0 | 1 | 0 | 0 | 1 |
| 10 | 11 | 0 | 0 | 0 | 0 | 0 | 1 | 0 | 0 | 0 | 0 | 1 | | | | |
| 5 | 11 | 0 | 0 | 0 | 0 | 0 | 0 | 0 | 0 | 0 | 0 | 1 | | | | |

IMAGE PROCESSING WITH IMAGE-SLANT CONTROL AND/OR IMAGE-SIZE CONTROL

BACKGROUND OF THE INVENTION

1. Field of the Invention

The present invention relates to an image processing apparatus for processing an image signal obtained by reading an image of an original.

2. Related Background Art

Various kinds of image processing methods for photoelectrically reading an original, outputting a resulting image signal, and electrically processing the original image have been proposed.

In such image processing methods, processing such as enlargement or reduction of the image, extraction or erasure of a partial image, or the like is executed, but processings to modify the original image or the like cannot be easily performed.

For example, when characters which are obtained by modifying predetermined typefaces are necessary in a graphic design field or the like or when perspective views of a building are necessary in the design field or the like, it is desired to easily obtain such slant characters or perspective views from the original image.

SUMMARY OF THE INVENTION

The present invention is made in consideration of the foregoing point and it is an object of the invention to enable the processes for modification and the like of an original image to be easily executed.

Another object of the invention is to provide an image processing apparatus which can arbitrarily change the output position of an image signal which is input.

According to one aspect of the invention is provided an image processing apparatus wherein the output position of an image signal which is input line by line can be changed every line or every few lines.

Still another object of the invention is to provide an image processing apparatus in which an input image signal is processed and the modified image can be formed on a recording material.

According to another aspect of the invention is provided an image processing apparatus in which the size with which an image is recorded on a recording material, is determined in accordance with a condition or characteristic of the image.

According to still another aspect of the invention is provided an image processing apparatus in which an amount by which an image is to be slanted in reproduction, relative to an original image, can be set, and the appropriate processing is carried out, i.e., by means of controlling the start position and/or timing for read-out of the image signals from a memory, either on a line-by-line basis or on the basis of units of a predetermined number of lines.

The above and other objects, operations, and advantages of the present invention will become apparent from the following detailed description and the appended claims with reference to the accompanying drawings.

BRIEF DESCRIPTION OF THE DRAWINGS

FIG. 17 is a diagram showing the content of a memory table for the shifting operation.

DETAILED DESCRIPTION OF THE PREFERRED EMBODIMENTS

Figure 1:
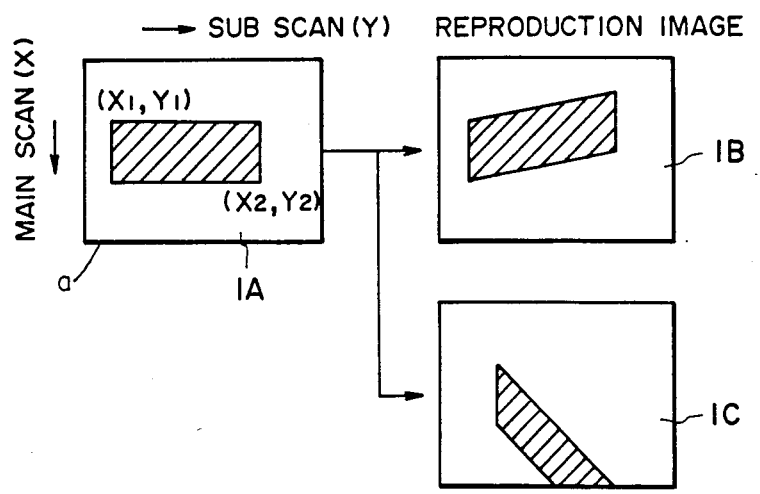
FIG. 1 is a diagrammatical view of image processes which can be realized according to the present invention.

The present invention will now be described by illustrative reference to the preferred embodiments thereof, as shown in the drawings.

First, FIG. 1 shows a diagrammatical view for the image processes which can be performed according to the present invention. In the diagram, reference numeral 1A denotes an original and the point indicated at a is used as an origin of the original. The original is main-scanned in the main scanning direction (X) by a line sensor such as a CCD or the like. The reading position of the line sensor is sequentially moved in the sub-scanning direction (Y). In this case, by sequentially shifting the image in the portion in the shaded rectangle two of whose covers are indicated by the coordinates $(X_1, Y_1)$ and $(X_2, Y_2)$ on the original line by line in the main scanning direction, a reproduction image as shown at 1B or 1C can be derived.

FIG. 2 shows a diagrammatical view of the image processes for the image signal of each line in the case of performing the image processes shown in FIG. 1 and an explanation will now be made hereinbelow.

Figures 2A, 2B:
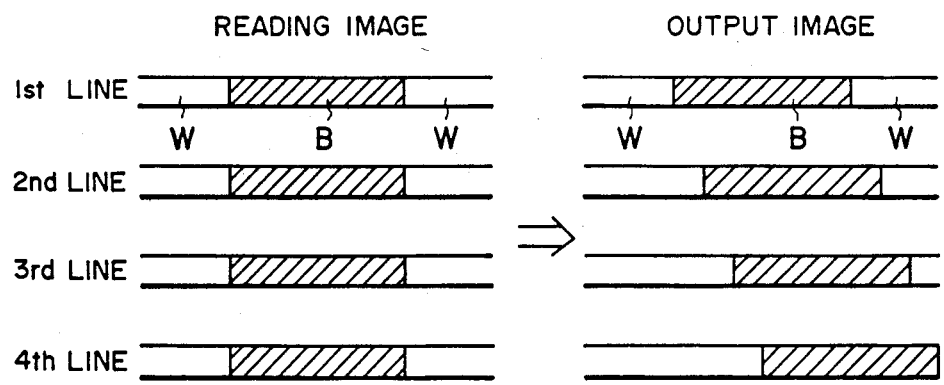
FIGS. 2A and 2B are detailed diagrammatical views of the image processes which can be realized according to the invention.

The image signal obtained by reading the original 1A in FIG. 1 is as shown in FIG. 2A. Namely, a white signal W continues for the distance corresponding to a plurality of pixels and a black signal B continues for a distance of $(X_2-X_1)$. Next, the white signal W again continues for the distance of a plurality of pixels. The image of the width in the X direction of the original continues as in each line. As shown in the diagram, similar images continue by a plurality of lines over a length $(Y_2-Y_1)$ as shown in the diagram.

As shown in FIG. 2B, by sequentially increasing the head white signal W line by line by the image processes, the reproduction image as shown in 1B in FIG. 1 is obtained. On the contrary, by sequentially decreasing the head white signal W and by also sequentially backwardly shifting the read-out start position of the image signal to thereby sequentially increase the post white signals W, the reproduction image shown at 1C in FIG. 1 is obtained.

When the shift amount is small or the resolution power is high, or the like, the shifting operation is not performed line by line but, for example, the shifting operation may be executed on a unit basis of a predetermined plurality of lines.

The image copying apparatus having the foregoing image processing function will be sequentially described with reference to FIG. 3.

Figure 3:
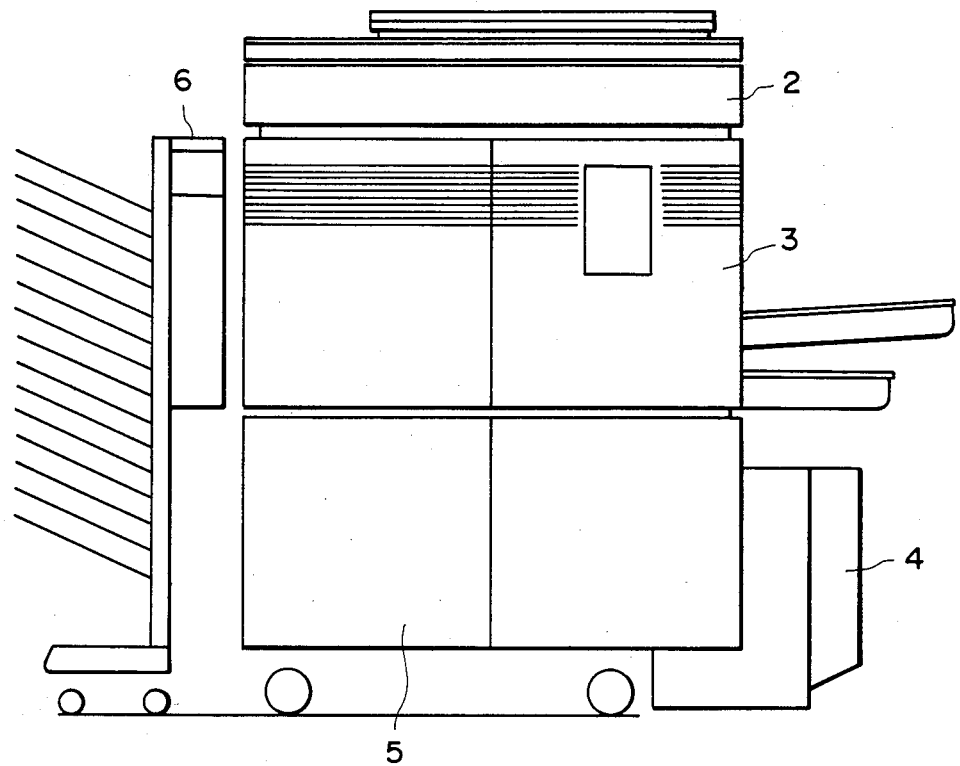
FIG. 3 is an external view of an image processing apparatus of embodiments of the invention.

In FIG. 3, reference numberal 2 denotes an original reading apparatus (hereinafter, referred to as a reader) for photoelectrically reading the original on a platen and outputting resulting images signal. Numeral 3 denotes an image forming apparatus (hereinafter, referred to as a printer) for forming a reproduction image onto a recording sheet on the basis of the image signal which is output from the reader 2; 4 is a paper deck to feed a recording sheet for forming an image to the printer 3 from the outside; 5 a pedestal on which the printer 3 is mounted; and 6 a sorter to sort the image formed recording sheets.

Figure 4:
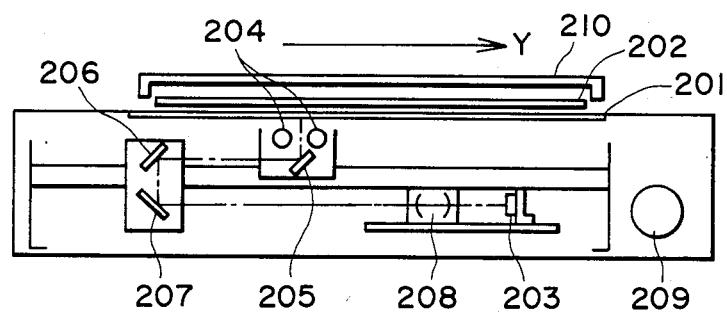
FIG. 4 is a diagram showing a construction of a reader of the first embodiment.

FIG. 4 is a schematic constructional diagram of the reader 2.

An image pickup device 203 such as a CCD or the like consisting of a plurality of photo-sensing elements which are arranged in an array is used to read the image of an original 202. The original 202 is pressed by an original cover 210 and put on an original base 201. The illumination light from a light source 204 is reflected by the surface of the original 202 and transmitted through mirrors 205, 206, and 207, so that an image is formed on the image pickup device 203 by a lens 208. The light source 204 and mirror 205 and the mirrors 206 and 207 are moved at the relative speed of 2:1 in the direction perpendicular to the array of photo-sensing elements of the image pickup device (i.e., in the sub-scanning direction).

The optical unit consisting of the light source 204 and mirrors 205 to 207 is moved from the left to right at a constant speed while it is controlled in a PLL ("phase locked loop") manner by a DC servo motor 209. The main scanning line which is perpendicular to the sub-scanning direction Y as the moving direction of the optical unit is read by the image pickup device 203 at the resolution power of about 16 pel/mm, and the optical unit is moved from the left end to the right end. Thereafter, the optical unit is returned from the right end to the left end. In this way, one scanning opperation is finished.

Figure 5:
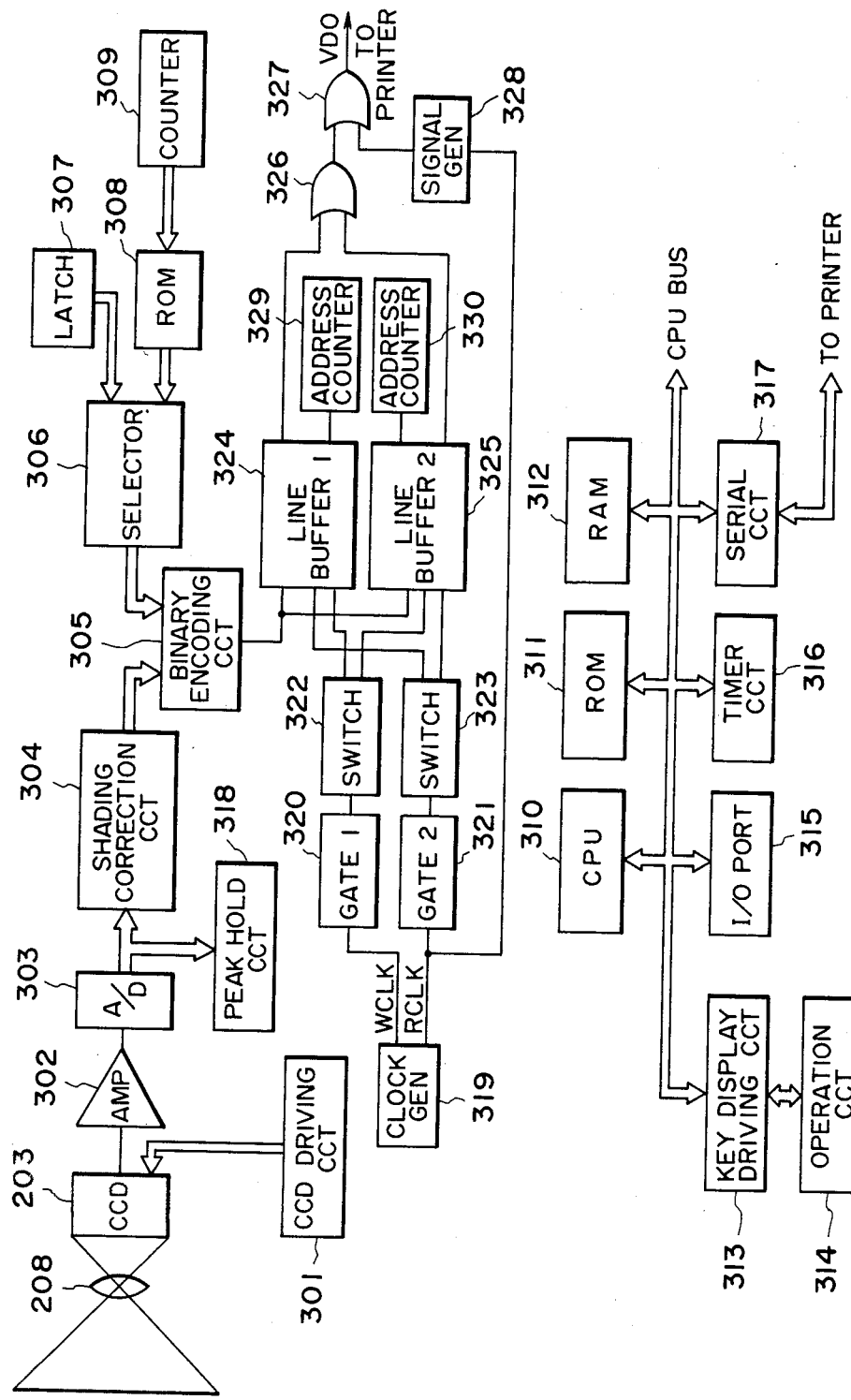
FIG. 5 is a construction diagram of an internal circuit of the reader shown in FIG. 4.

FIG. 5 is a block diagram showing an example of an internal construction of the reader 2.

The optical lens 208 is used to form the image of the original put on an original base (now shown) on the CCD 223. The original image is sequentially scanned by an optical system (not shown). Since the foregoing reading technique is well known, its detailed description is omitted.

The CCD 203 is driven by a CCD driving circuit 301 and converts the light and dark images of the original into an electric signal. The electric signal is amplified by an amplifier 302 and converted into the digital signal, having multi-values, every pixel by an analog/digital (A/D) converter 303.

Further, the digital signal is processed by a shading correction circuit 304 to remove the shading which is caused by fluctuation of the light emission of the light source, a variation of the luminous intensity distribution of the optical system, a fluctuation of the sensitivity of the CCD, or the like. After the shading has been removed, the digital signal is sent to a binary encoding circuit 305 and converted into a binary digital image signal.

There are two kinds of binarizing methods in the binary encoding circuit 305: a method whereby a constant binarization level given by a latch circuit 307 is used; and what is called a dither method whereby the binarization level which is periodically changed within a predetermined matrix size by a dither ROM 308 is used. Either one of those methods is selected and switched by a selector 306. The dither method is intended to artificially reproduce half tones by use of the binary signal and is widely used in facsimile apparatuses and the like.

In this embodiment, the former method whereby a constant binarization level is given is selected for an original having a character image or the like, and the dither method is selected for an original such as a photograph or the like which requires gradation. By this selection, the optimum copy image can be obtained.

The dither ROM 308 sequentially reads out a dither pattern stored in the addresses which are given by a counter 309.

The image signal binarized by the binary encoding circuit 305 is sequentially alternately stored in line buffers 324 and 325. Each of the line buffers 324 and 325 has a memory of a capacity of one line. The image signal is alternately written into the line buffers 324 and 325 in response to a clock (WCLK) which is generated from a clock generator 319. The writing timing is determined by controlling the clock by a gate 320 and a switch 322. The image signals written in the line buffers 324 and 325 are sequentially read out of the line buffers in response to a read-out clock (RCLK) which is generated from the clock generator 319. The reading timing is decided by controlling the clock by a gate 321 and a swtich 323. The read-out start address is controlled by address counters 329 and 330.

The image signals which have been read out of the line buffers 324 and 325 are synthesized with a white signal which is generated from a white signal generator 328 (by OR circuits 326 and 327) and output as a VDO signal to the printer.

The gate circuit 321 is constituted by a counter and outputs a read-out clock on the basis of the count number designated by a microcomputer, which will be explained hereinafter. Therefore if the count number which is designated is changed every main scan, the image can be shifted, line by line, in the main scanning direction.

Therefore, in order to output an image as shown at 1B in FIG. 1, the preset count number of the gate circuit 321 is sequentially increased. Thus, it is apparent that the images are sequentially delayed in the main scanning direction. By increasing the values of the address counters 329 and 330 line by line, an image as shown at 1C in FIG. 1 can be obtained.

A peak hold circuit 318 detects the peaks of the black level and white level of the image signal and also detects the white levels at the first and last timings of the main scan and sub scan. The microcomputer, which will be explained hereinafter, performs automatic density adjustment (AE) and detects the original size on the basis of the detection values of those black and white levels.

A CPU 310 operates in accordance with the control program written in a ROM 311 and controls the whole operation of the reader by use of a RAM 312, an I/O port 315, a timer circuit 316, a serial circuit 317, and a key display driving circuit 313.

The key display driving circuit 313 performs the scanning of a key matrix of an operation unit 314 and drives display devices such as LED and the like. The serial circuit 317 gives a control instruction to the printer or, contrarily, receives information.

Figure 6:
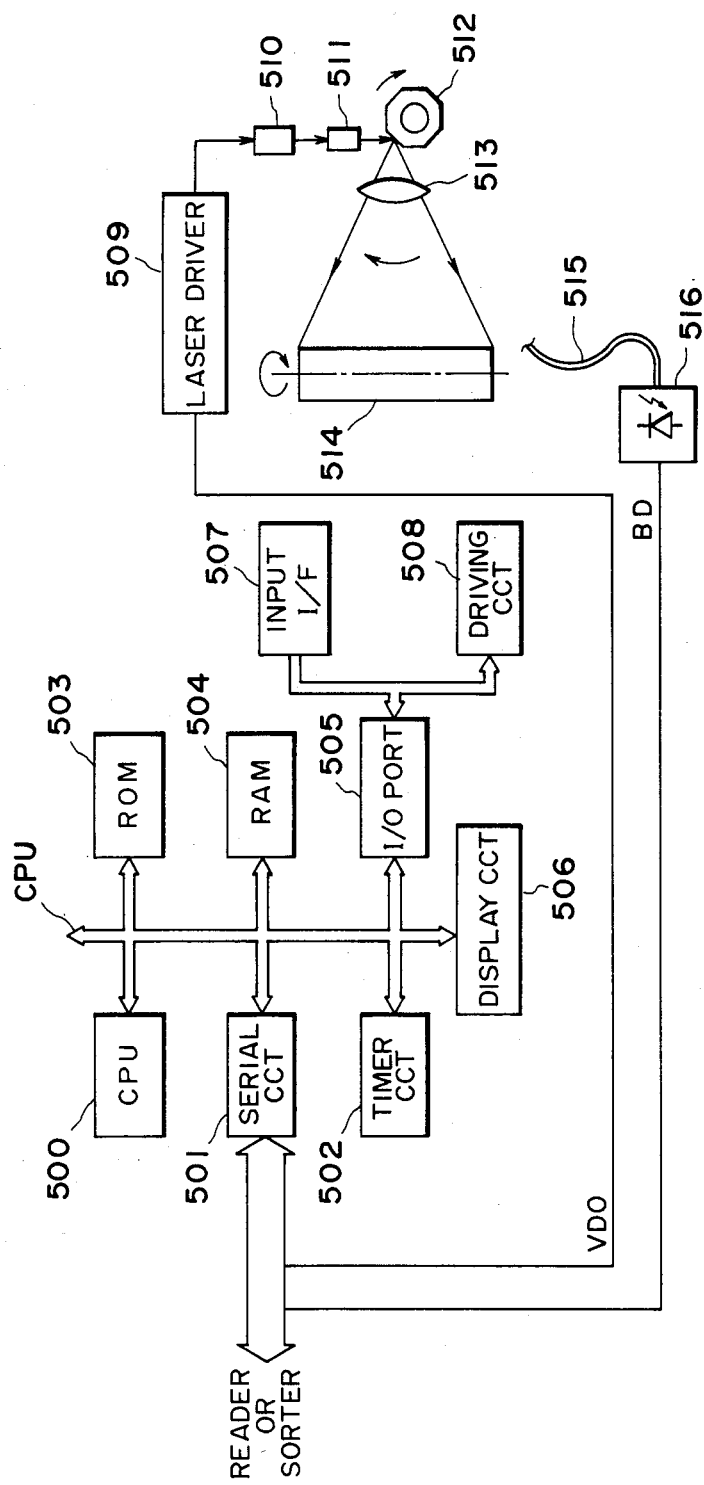
FIG. 6 is a block diagram of an internal circuit of a printer.

FIG. 6 is a block diagram showing an example of an internal construction of the printer 3.

As shown in FIG. 6, the serial signal from the reader 2 is input to a serial circuit 501 and processed by a CPU 500. The serial circuit 501 is also used to exchange information with the sorter 6.

The CPU 500 operates in accordance with the control program stored in a ROM 503 and controls the whole operation of the printer by use of a RAM 504, a timer circuit 502, and an I/O port 505.

An input interface 507 receives the detection signals from sensors to detect a recording sheet set in the printer and the like. A driving circuit 508 drives a motor (not shown), a high voltage transformer, and the like. A display circuit 506 is used to display the state of the printer, such as, no printing sheet, occurrence of a jam, or the like.

A VDO signal (image signal) which is transmitted from the reader is supplied to a laser driver 509 and converted by a semiconductor laser 510 into a laser beam based on the VDO signal. The laser beam is focused by a collimator lens 511 and reflected by a polygon mirror 512 which is rotating at a high speed. A photo-sensitive drum 514 which is rotating at a predetermined rotational speed is scanned by the reflected laser beam in the direction which is substantially parallel with the rotational axis of the drum 514. The light amount of the scanned laser beam is corrected by an f−θ lens 513 and irradiated onto the drum 514, thereby forming a latent image on the basis of the VDO signal.

The printer 3 forms an image by what is called an electrostatic recording method. The necessary portions of the charges applied onto the photo-sensitive drum 514 are removed by the laser beam. The developing process is executed using a development agent and the image is transferred and fixed onto the printing sheet. Since the electrostatic recording method is the well-known technique, its detailed description is omitted.

The laser beam scanned by the polygon mirror 512 enters an optical fiber 515 before it is irradiated onto the drum 514. When a photo-detector 516 detects the incident laser beam, it outputs an electric signal (BD signal).

The reader 2 waits for the period of time after the generation of the BD signal until the laser beam reaches the drum 514. Thereafter, the reader 2 outputs the VDO signal. Thus, the latent image is formed at the proper position on the drum 514.

Figure 7:
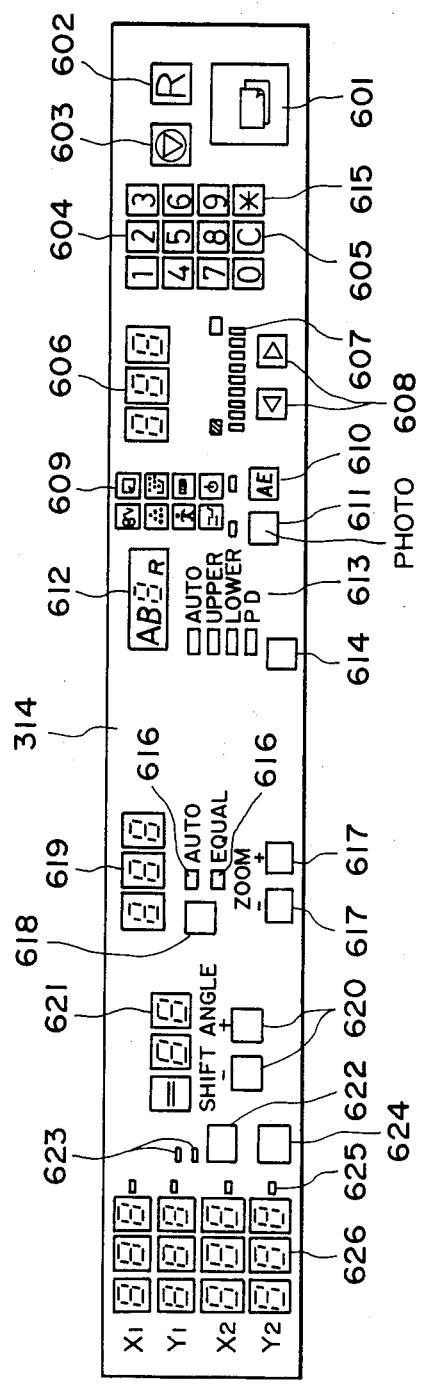
FIG. 7 is an external view of an operation unit of the reader shown in FIG. 4.

FIG. 7 shows the operation unit of the reader 2 and this operation unit will be described hereinbelow.

A copy start button 601 is pressed to instruct the apparatus to start of the reading operation of the original and the copying operation. A reset key 602 is used to return various set values to a predetermined values (e.g., the number of copy sheets is set to 1). A stop key 603 is pressed to stop the copying operation.

A ten-key pad 604 is used to set the number of copy sheets or the like. A clear key 605 is pressed to clear the copy number. An enter key 615 is used to input trimming coordinates (which will be explained in detail hereinafter). A copy number display section 606 displays the set number of copy sheets and the number of remaining copy sheets during the copying operation. A density display section 607 indicates the copy density. An arbitrary copy density can be selected by a selection key 608. An AE key 610 is pressed to select the automatic density adjustment mode. A photograph key 611 is pressed to select the binarization using a constant level or the binarization using the dither method; these methods have already been described with reference to the binary encoding circuit in FIG. 5. An error display section 609 displays errors which may occur in the reader and printer.

A sheet size display section 612 displays the size of copy sheet to be used. A sheet cassette display section 613 displays the cassette of sheet to be fed. The sheet cassette is sequentially selected by a selection key 614. "AUTO" in the sheet cassette display section 613 shows the operation for allowing the reader to automatically select the sheet cassette in accordance with the detected original size by the original detecting operation.

A magnification display section 619 displays a magnification, and its value is increased or decreased by a zoom key 617. A selection key 618 is used to reset the magnification to the equal magnification (magnification of 1) and to set the automatic variable magnification. The selected magnification is displayed by an indicator 616. The automatic variable magnification is used to automatically change the detected sheet size in accordance with the designated sheet size.

A shift angle display section 621 displays an angle of inclination of the original with respect to the main scanning direction when the operator wants to incline the original image. This angle is increased or decreased by an angle up/down key 620 and can be designated to a value within a range of −90° to +90°.

A selection key 622 is used to perform the trimming (to output the image in only a designated area). When the selection key 622 is activated, that is indicated by an indicator 623. Numeral 626 indicates a display showing the trimming points (diagonal coordinates values ($X_1$, $Y_1$, $X_2$, $Y_2$) shown at 1A in FIG. 1). The trimming points are shown by the distance (the unit is mm) from the origin of the original. A desired point is selected by a selection key 624. When it has been selected, a result of the selection is indicated by an indicator 625. By subsequently pressing the enter key 615, the selected coordinate display section flickers. A desired distance is input by the ten-key pad 604 and the enter key 615 is again pressed. Thus, the setting is finished and the numerical value is displayed on the selected display section.

Figure 8:
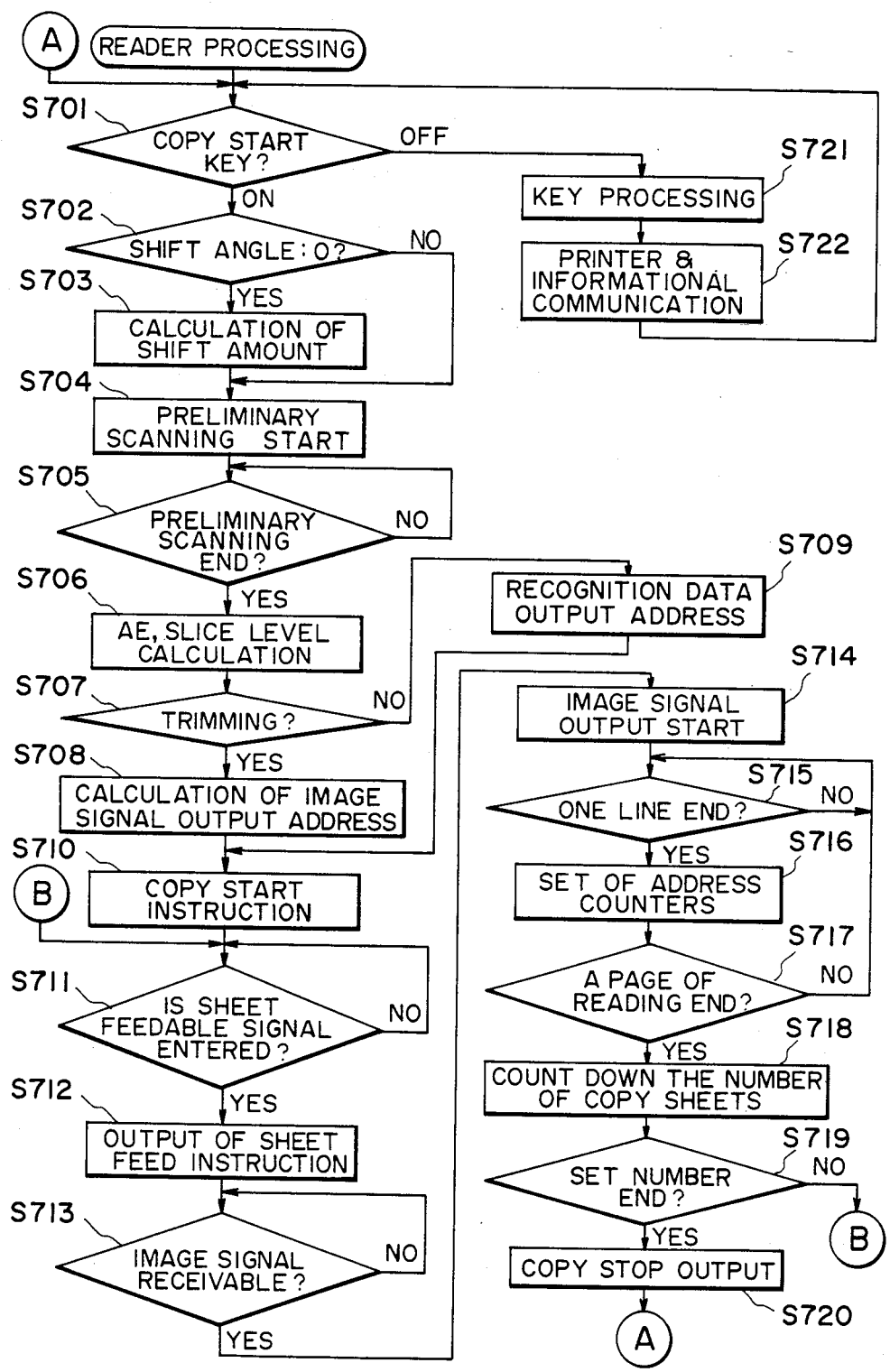
FIG. 8 is a control flowchart for the reader shown in FIG. 4.

FIG. 8 shows an operating procedure of the microcomputer (CPU 310) of the reader. This procedure will be explained hereinafter.

If it is decided in step S701 that the copy start key 601 is not pressed, a check is made in step S721 to see if another key has been pressed or not. If another key has been pressed, the process corresponding to this key is executed as previously described in conjunction with the operation unit (FIG. 7). Then, various data (regarding errors, sheet size, and the like) are communicated with the printer through the serial circuit (step S722).

If the copy start key 601 has been pressed, a check is made in step S702 to see if the shift angle has been input from the operation unit or not. If the answer is YES, the shift amount is calculated (S703). In this embodiment, the ROM 311 is provided with a table in which the respective shift amounts corresponding to the shift angle data is stored. The shift amount is obtained by accessing this table at the input shift angle. This table is constituted so as to perform the shifting operation on a unit basis of a predetermined number of lines. A fraction which cannot be completely divided by the unit number of lines is corrected by increasing the shift amount of one pixel to a number of lines which is smaller than the unit number of lines, or the like. For example, when the input shift angle is 45°, a datum to shift eight bits at a time, every eight lines, is stored in the table. The arithmetic operating expression to obtain the shift amount is defined and the shift amount may be also calculated by this expression without using the table. The shifting operation may also be executed line by line or every few lines.

After completion of the calculation (to make the shift table) of the shift amount, the preliminary scanning to hold the peak shown in FIG. 5 for the detection of the original and for the AE is executed (S704).

After completion of the preliminary scanning (S705), the slice level and dither which are given to the latch circuit 307 are selected (in step S706) on the basis of the data stored in the peak hold circuit 318. Then, a check is made in step S707 to see if trimming has been designated by the operation unit or not. If YES, the output address of the image signal is calculated (S708) on the basis of the input coordinates from the operation unit, the detection data stored by the preliminary scanning, and the magnification data from the operation unit.

If trimming has not been designated, the output address is calculated by the detection data and the magnification data from the operation unit (S709).

Next, a copy start instruction is output to the printer through the serial communication (S710). After the printer 3 has received the copy start instruction, it starts the operation in accordance with the electrostatic recording method a well-known technique, as mentioned above. After a sheet feedable signal has been input from the printer 3 (S711), a sheet feed instruction is output (S712). After the printer started the feeding of the sheet from the designated sheet cassette, it enters the receivable state of the image signal (S713), the optical system is made operative to read the original, and the output of the image signal is started (S714).

After completion of the output of one line of the original image (S715), the values which are set into the gate circuits 320 and 321 and address counters 329 and 330 are calculated on the basis of the shift table, output address, or the like, and the calculated values are set into the appropriate registers (S716). In this embodiment, the foregoing BD signal from the printer 3 is used as a sync signal of one line.

A check is made (step S717) to see if the image data of one page has been completely read or not. If YES, the number of copy sheets is decremented (S718). Further, a check is made to see if a number of copying operations equal to the set copy number have been finished or not (S719). If NO, the processing routine is returned to step S711. If YES, a copy stop instruction is output to the printer 3 (S720) and the processing routine is returned to step S701.

In the embodiment, the image has been sequentially moved in one direction as shown in FIG. 1. However, with the construction of this embodiment, the moving direction of the image and the moving amount of the image of each line can be also changed as shown at 9B, 9C, and 9D in FIG. 9.

On the other hand, as shown at 9E to 9F, the image can be also easily rotated or skewed in the main scanning direction by simply changing the circuit of the address counters of the line buffers in the embodiment and the control method.

Figure 9:
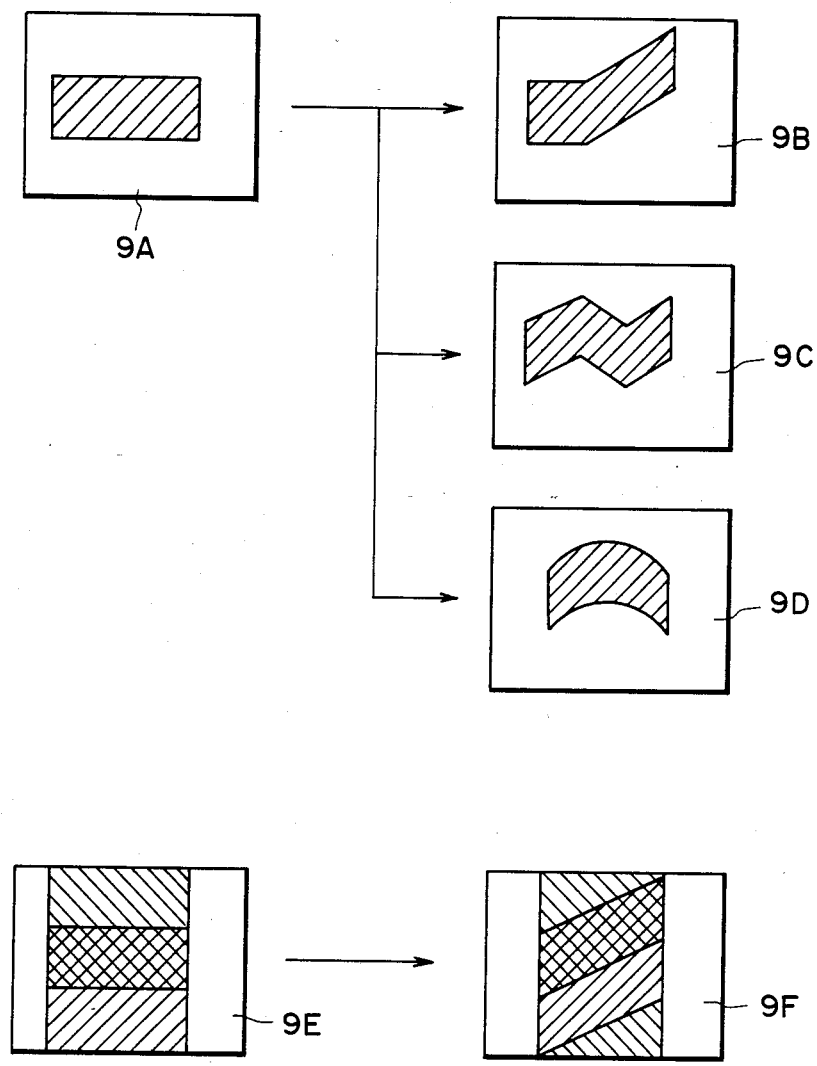
FIG. 9 is a diagrammatical view of the image processes.

In addition, although the control has been performed by designating the angle in this embodiment, the image control can be also easily realized by designating the moving position. Although the movement of the image has been designated by the operation unit, a coordinate input apparatus such as digitizer or the like can be connected and the moving position can also be designated by inputting desired coordinates. This method is useful for the designation and the like of various image processes as shown in FIG. 9.

The image shift has been performed when the image data is read out of the buffer memory in this embodiment. However, the image shift can also be accomplished by controlling the write-in address when the image data is written into the buffer memory.

As described above, in the image reading apparatus for reading the original and outputting the image signal, the modifying process of an arbitrary image can be executed by shifting the image position in the main scanning direction line by line or on a unit basis of a plurality of lines.

In the foregoing embodiment, the image has been shifted in the main scanning direction by controlling the read-out address in the line buffer. However, the same output result can be also obtained by another method whereby the read-out start timing from the line buffer is shifted.

A construction to control the read-out timing from the line buffer will now be explained as the second preferred embodiment of the invention.

Figure 10:
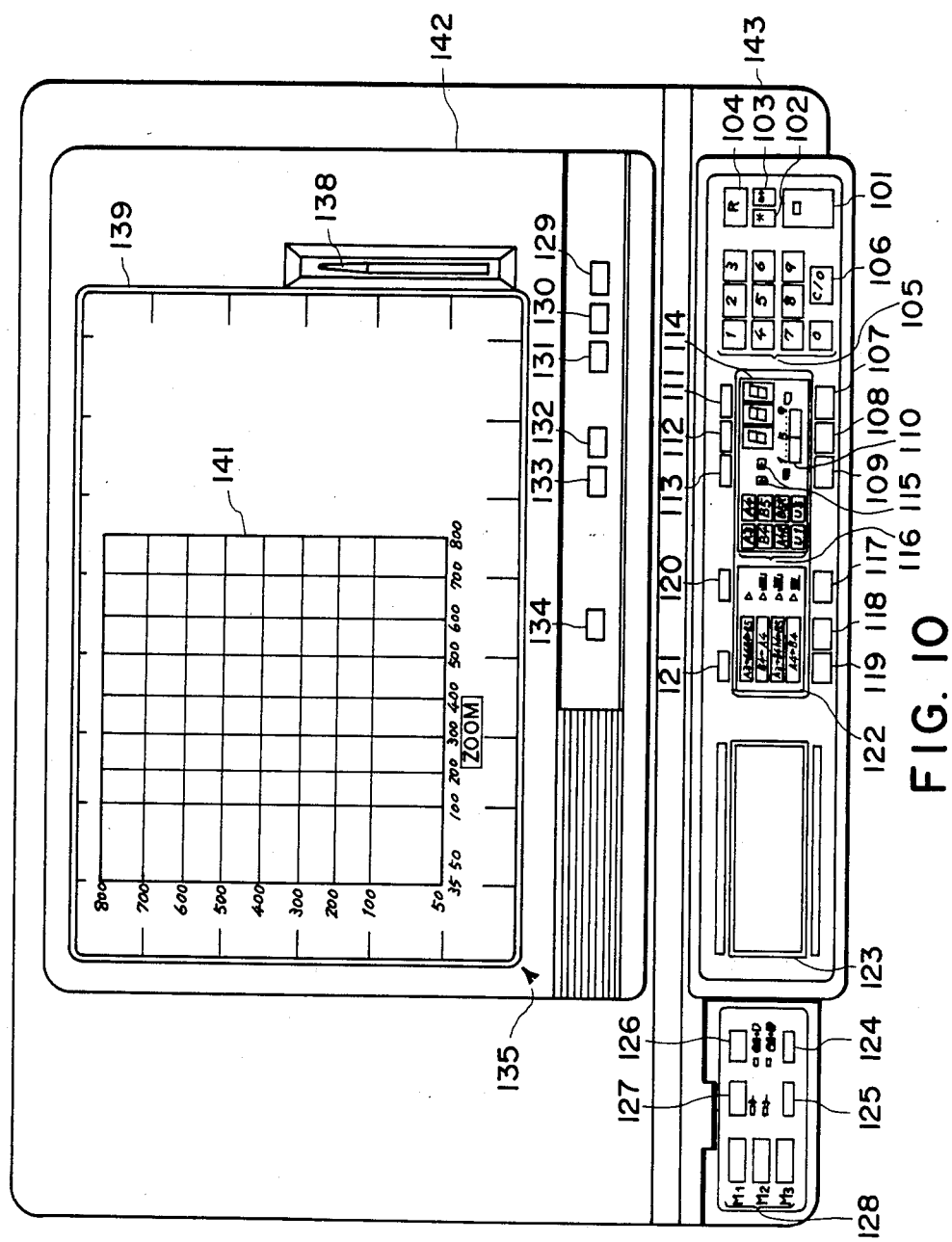
FIG. 10 is an external view of a reader of a second embodiment, seen from the upper surface.

FIG. 10 shows an external view of a reader in the second embodiment when it is seen from above.

The reader comprises: an operation unit 143; an original mounting section (not shown) and an original reading section (not shown); and an original base pressing plate 142.

The construction of the reader in this embodiment will now be sequentially explained hereinbelow. The operation unit 143 is connected to the original reading apparatus and also displays the data of the printer section to form an image on the basis of the image data. A start key 101 is pressed to start the original reading operation.

An asterisk key 102 is used to set a service mode or the like.

A recall key 103 is used to designate the recall mode, which can recall the preceding copy mode. A reset key 104 is pressed to reset various set modes to the standard modes. A ten-key pad 105 is used to set the number of copy sheets.

A clear stop key 106 is pressed to clear the copy number designated by the ten-key pad and to stop the copying operation. Density keys 107, 108, and 109 are used to designate the manual copy density adjustment and the automatic copy density adjustment (AE). The designated content is displayed by an indicator 110.

A photograph key 111 is pressed to copy a half-tone image such as photographic original or the like. A high contrast key 112 is pressed to clarify the contrast (black and white) of the image. A negative/positive reversal key 113 is pressed to reverse the white level and black level of the image.

A copy number display section 114 displays the set number of copy sheets and the number of remaining copy sheets during the copying operation. An indicator 115 displays the setting direction of the original on the basis of the copy magnification and sheet size. As indicator 116 displays the sheet size. A cassette selection key 117 is pressed to designate the sheet cassette of the printer. An equal magnification key 118 is pressed to select the equal magnification copy mode. A fixed size variable magnification key 119 is used to set a desired variable magnification. An automatic variable magnification key 121 is pressed to select the automatic variable magnification copy mode to automatically determine the variable magnification. An indicator 122 displays the magnification in the fixed size variable magnification copy mode.

An automatic sheet selection key 120 is pressed to automatically select the sheet size on the basis of the original size or the like. A liquid crystal display (LCD) section 123 consists of a liquid crystal display which is constituted by 240 dots × 64 dots and performs the display operation under control of a microcomputer, which will be explained hereinafter.

The surface of the LCD section 123 is covered by a transparent touch panel. The touch panel includes therein transparent electrode switches in a 4×10 matrix. The coordinate values designated by a finger or the like are input to the microcomputer, so that the designated position can be known. A two-sided/multi-copy key 124 is pressed to designate the two-sided copy mode or multi-copy mode of the printer. A sort/collate key 125 is used to designate the operation of the sorter which is connected to the printer. A center movement key 126 is pressed to move the image data to the center of the sheet. An original recognition key 127 is used to select whether an operation to automatically recognize the original size is to be performed or not.

A memory key 128 is pressed to store various operating modes or to access them all together.

An original base pressing plate 142 presses the original put on an original base (not shown) and has an operation unit provided with a digitizer and keys. Various kinds of setting operations can be performed by the operation unit.

A digitizer 139 can input the coordinate data indicated on the board by a touch pen 138 to the microcomputer. The coordinate data is recognized as position data on the original or magnification data indicated at 141 in combination with the operating mode. The magnification data is obtained by converting the coordinate values in accordance with the program in the microcomputer. Therefore, as shown in FIG. 10, a display range of the necessary magnification can be set to a large area (in this embodiment, the magnification range of 35 to 100% is enlargedly shown).

A zoom key 129 is pressed to designate a magnification. A desired magnification is designated by instructing a zoom coordinate area 141 by the touch pen 138 after the zoom key 129 has been pressed.

An area designation key 130 is pressed to designate the area which is to be subjected to the image processing. After pressing the key 130, the position on the processing original put on the digitizer 139 by setting the corner to a reference point 135 is designated by the touch pen 138, so that an arbitrary area can be designated.

A movement key 131 is pressed to move an image. After pressing the key 131, the moving position is designated by the touch pen 138 and the touch panel of the LCD section 123.

A page serial copy key 132 is pressed to output the original image onto a plurality of sheets.

An enlargement serial copy key 133 is pressed to output the enlarged image of an original onto a plurality of sheets.

A slant key 134 is pressed to sequentially move the original image line by line or on a unit basis of a predetermined number of lines in the main scanning direction and to copy it.

Figure 11:
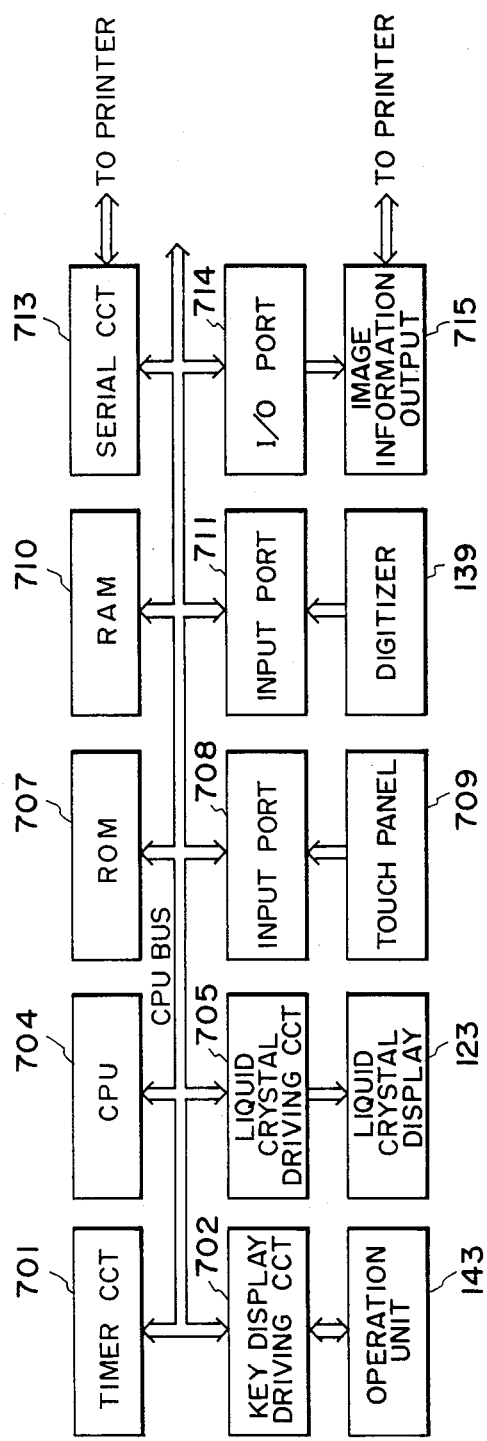
FIG. 11 is a block diagram of an internal circuit of the reader shown in FIG. 10.

FIG. 11 shows a constructional diagram of the circuit regarding the control of the operation of the reader and this construction will now be explained hereinbelow.

A CPU 74 operates in accordance with the control program written in a ROM 707 and controls the whole operation of the original reading apparatus by use of a RAM 710, an I/O port 714, a timer circuit 701, a serial circuit 713, a key display driving circuit 702, a liquid crystal driving circuit 705, and input ports 708 and 711.

The key display driving circuit 702 performs the scanning of the key matrix of the operation unit 143 and drives the display devices such as LEDs and the like.

The liquid crystal driving circuit 705 is the control circuit to display various data on the LCD section 123.

The RAM 170 stores the area data designated by the digitizer and the data such as magnification value and the like.

The input port 708 is used to input the coordinate values on a touch panel 709 of the LCD section 123.

The input port 711 is used to input the coordinate values on the digitizer 139.

The I/O port 714 is used to control each section (a fluorescent lamp to illuminate the original, an optical system driving motor, and the like) of an image data output section 715 to read the original image and output the image data.

The serial circuit 713 is used to give control instructions to the printer and the like or to contrarily receive data.

Figure 12:
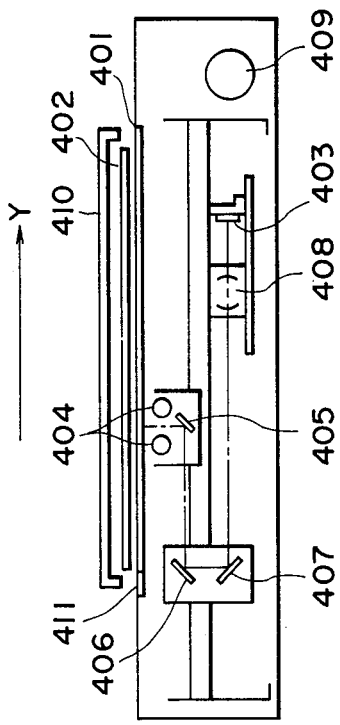
FIG. 12 is a construction diagram of the reader shown in FIG. 10.

FIG. 12 shows an embodiment of an internal construction of the reader. Reference numeral 401 denotes an original base; 402 is an original pressing plate; 403 a CCD which consists of a plurality of photo sensing elements arranged in a line and reads the image; 404 a fluorescent lamp to illuminate the original; 405 tp 407 mirrors; 408 a lens to form an image; and 409 a motor. By moving the fluorescent lamp 404 and mirrors 405 to 407 (optical system) by means of the motor 409, the original is sub-scanned in the Y direction, thereby sequentially forming original images onto the CCD 403. In this manner, the original image is sequentially read and scanned line by line. A reference white plate 411 is used to obtain the data for the shading correction. When the fluorescent lamp 404 and mirrors 405 to 407 are disposed at the positions such that the lamp 404 illuminates the reference white plate 411 and the reflected lights from the white plate 411 are led to the CCD 403, this state is called a home position.

Figure 13:
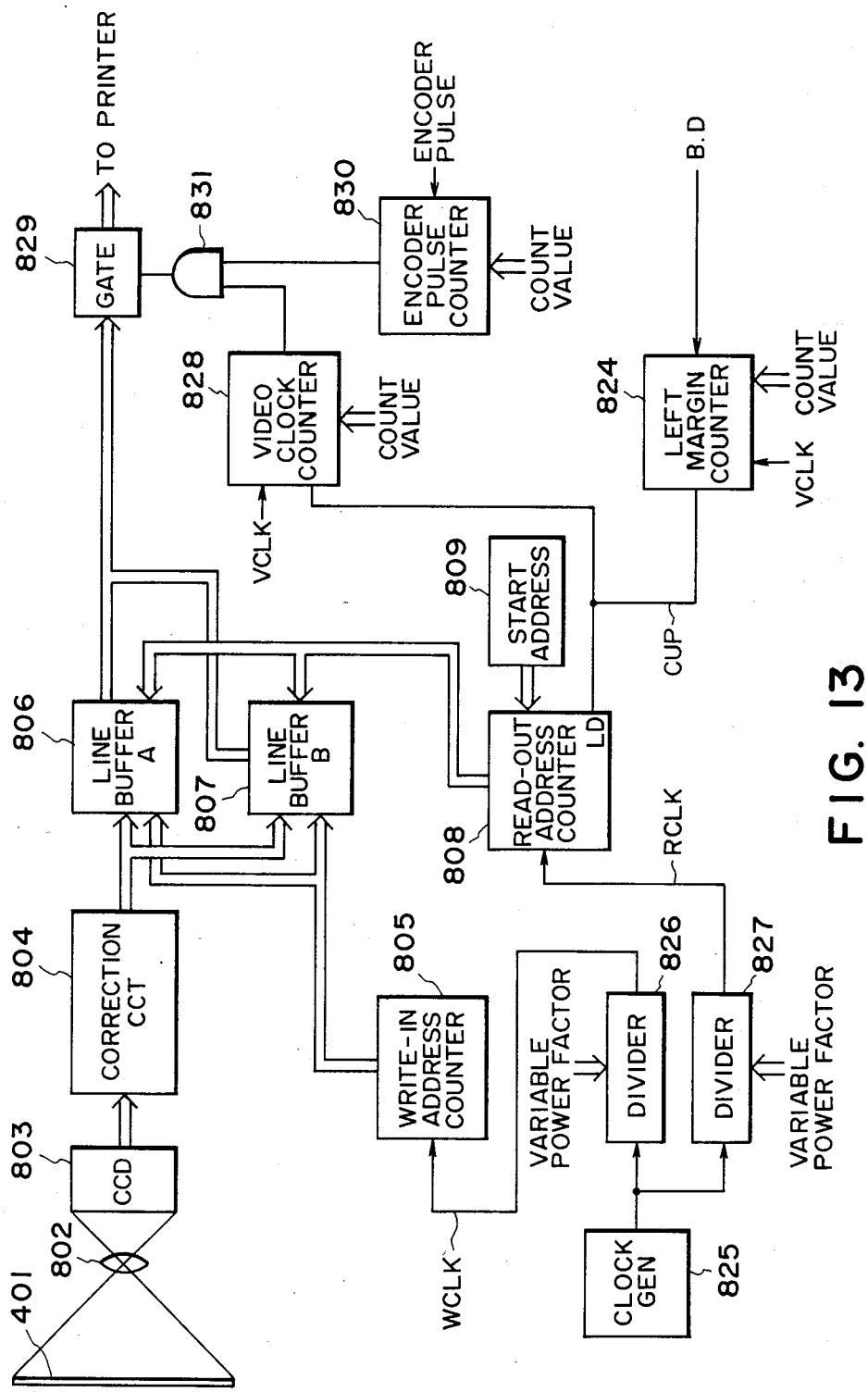
FIG. 13 is a circuit block diagram of an image signal output section of the reader shown in FIG. 10.

FIG. 13 shows a schematic circuit block diagram of the image signal output section of the reader shown in FIG. 12. The construction of this section will now be explained hereinbelow.

The reflected lights of the original 401 illuminated by the fluorescent lamp 404 are transmitted to a charge coupled device (CCD) 803 through a lens 802. The original image input to the CCD 803 is separated into pixels and supplied to a correction circuit 804 to perform the shading correction and the like. The corrected pixel data is input to a line buffer A (806) or B (807).

In this case, the pixel data is alternately written into the line buffer A 806 or B 807 line by line on the basis of the address from a write-in address counter 805. The address counter 805 is controlled by a write clock WCLK.

The frequencies of the write clock WCLK and read clock RCLK are determined in accordance with the variable magnification by an image variable magnifying method in such a manner such that in the case of enlarging the image, the frequency of the write clock is set to be the same as that in case of equal magnification, whereas the frequency of the read clock is set to be lower, and in the case of reducing the image, the frequency of the write clock is set to be lower, whereas the frequency of the read clock is set to be the same as that in case of equal magnification. A reference clock which is generated from a clock generator 825 is divided by a divider 826 in accordance with the variable magnification and is supplied to the write-in address counter 805. A dividing value is set into the divider 826 from the CPU 704.

The image data written in the line buffer A 806 or B 807 is read out in response to the address which is output from a read-out address counter 808 and output to the printer. The read-out address counter 808 counts up the address in response to a read clock (RCLK) which is generated in accordance with the variable magnification by the clock generator 825 and a divider 827 similarly to the write-in address counter 805.

The address counter 808 loads a start address from a start address register 809 in response to a count-up signal CUP of a left margin counter 824 and starts the reading operation from the start address.

The BD signal as a recording start signal of each line in the main scanning direction of the printer is input to the left margin counter 824. When counting operations equal in number to a predetermined count value has been executed in response to the BD signal and the count value has been increased, the count-up signal CUP is generated. Although the BD signal is generated in the printer, it is generated at a position out of the image area as will be explained hereinafter. The count value can be changed by the CPU 704.

Therefore, by changing the count value which is set into the left margin counter 824 by the CPU 704, the period of time after the generation of the BD signal until the output of the image signal can be changed. Accordingly, by increasing or decreasing the count value which is set to the left margin counter 824 line by line or on a unit basis of a few lines, the image output as shown in FIG. 1 can be derived, as with the construction of the foregoing embodiment.

Namely, as mentioned above, in FIG. 1, numeral 1A denotes the original and the portion of a is set to the origin of the original. The original image is main-scanned in the main scanning direction (X) by a line sensor such as CCD or the like. The reading position of the line sensor is sequentially moved in the sub-scanning direction (Y). At this time, by sequentially changing the count value which is set to the counter 824, the image in the area surrounded by the coordinates $(X_1, Y_1)$ and $(X_2, Y_2)$ on the original is sequentially shifted line by line in the main scanning direction, so that the reproduction image shown at 1B or 1C of FIG. 1 can be derived.

FIG. 2 shows a diagrammatical view of the image processes for the image signal of each line in the case of performing the image processes shown in FIG. 1 by the construction of this embodiment. The image processing will now be explained hereinbelow.

The image signal obtained by reading the original 1A in FIG. 1 is as shown in FIG. 2A. Namely, the white signal W continues for the distance corresponding to a plurality of pixels and the black signal B continues for the distance of $(X_2-X_1)$. Next, the white signal W again continues for the distance corresponding to a plurality of pixels. The image corresponding to the width in the X direction of the original continues as a whole. As illustrated in the diagram, the similar image continues for a plurality of lines over a length $(Y_2-Y_1)$.

By sequentially increasing the count value of the counter 824 every line, the reproduction image as shown in FIG. 2B is derived. On the contrary, by sequentially decreasing the count value of the left margin counter 324, the reproduction image of 1C in FIG. 1 is obtained.

When the shift amount is small or the resolution power is high, or the like, the shifting operation is not performed line by line. In place of this, for example, the shifting operation may be also executed on a unit basis of a plurality of lines.

A video clock counter 828 counts video clocks VCLK of one line after the generation of the CUP signal and generates a gate signal to a gate circuit 829 through an AND gate 831, thereby allowing output of the image signal in the main scanning direction. Thus, the output width of the image signal to the printer is controlled by the gate signal and gate circuit 829. A count value can be set into the video clock counter 828 from the CPU 704.

As described above, the motor 409 is used to move the optical system in the sub-scanning direction. An encoder to form pulses responsive to the rotation of the motor is attached to the motor 409. By counting the number of pulses, the movement distance in the sub-scanning direction of the optical system is measured. An encoder pulse counter 830 allows output of the image signal in the sub scanning direction. The count value can be set and read out by the CPU 704 at any time.

The gate circuit 829 outputs the image signal to the connected apparatuses such as printer and the like shown in FIG. 6 for the period of time permitted by the gate signal.

Figure 14:
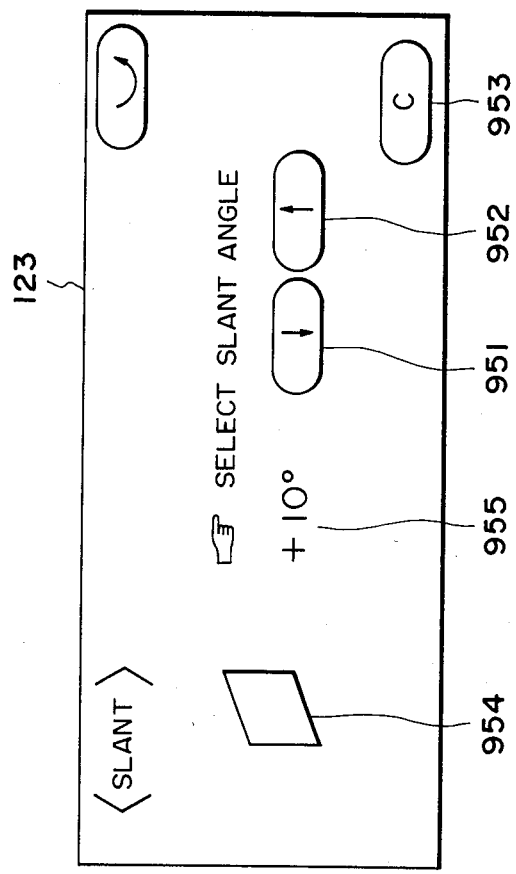
FIG. 14 is an external view of an operation unit.

FIG. 14 shows a method of designating the slant mode using the LCD section 123 of the operation unit 143.

When the slant key 134 on the digitizer 139 is pressed, the LCD section 143 displays as shown in FIG. 14. The operator designates a desired slant angle by pressing displayed key sections 951 ad 952. In this embodiment, the angle can be set every 5° within a range of −85° to +85°. The slant angle can be also designated in increments of 1° by a similar technique. When the key 951 or 952 is pressed, the numerical value displayed in a slant angle display section 955 is increased or decreased on a 5° unit basis (i.e., in increments of 5°). A schematic figure is displayed in a graphic display section 954. A displayed C key 953 is used to erase the slant mode.

Figure 15:
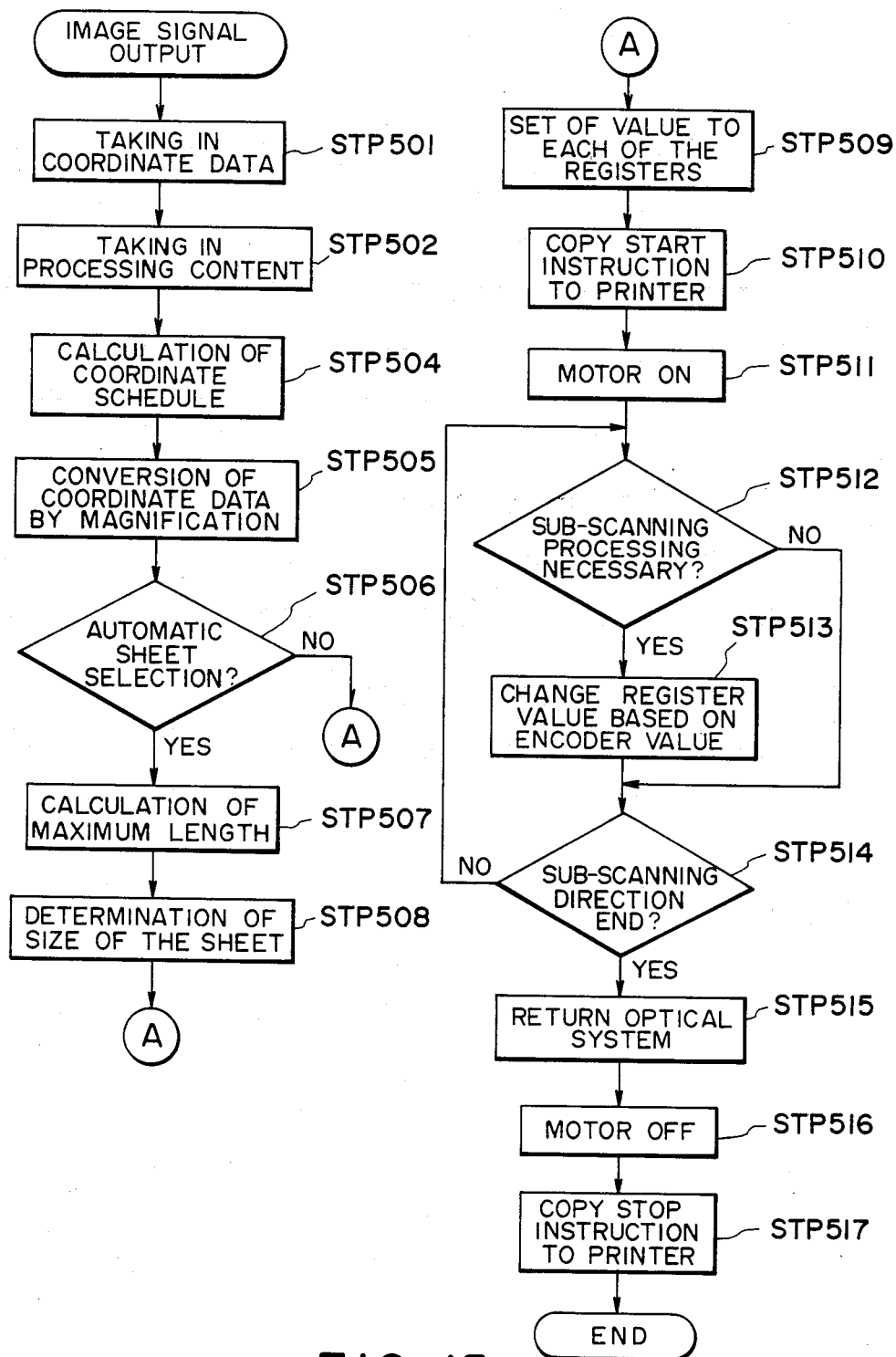
FIG. 15 is an operation flowchart showing a control procedure.

FIG. 15 is a flowchart for the operation in the case of outputting an image in the slant mode of the CPU 704. The operation will now be explained hereinbelow.

First, the coordinate data on the digitizer 139 to designate an area or magnification is taken in (STP 501). The inputs from the depressed keys on the digitizer 139 and operation unit 143 are taken in (STP 502). Then, the schedule calculation is carried out on the basis of the coordinate data and operation modes (STP 504).

The schedule calculation is a control procedure in the main and sub-scanning directions in order to realize the function. In the slant mode, the data with respect to the number of encoder pulses (corresponding to the movement amount of the optical system and the number of lines) and the number of pixels which are shifted in correspondence to the angles designated by the operator as mentioned above is stored as a table in the ROM 707. Therefore, the schedule calibration is executed on the basis of this data.

Namely, in this embodiment, the ROM 707 is provided with a table in which the shift amount corresponding to the shift angle data is stored. The shift amount is obtained by accessing this table by the input shift angle.

For example, if the input shift angle is 45°, a datum to shift the image data by eight bits, every eight lines, is stored in the table. In place of using the table, an arithmetic operating expression to obtain a shift amount is defined and the shift amount may also be calculated from this expression. The shifting operation can be also performed line by line or on a unit basis of a predetermined number of lines.

In this manner, the count value which is set into the left margin counter 824 is obtained in correspondence to the moving position (amount) of the optical system, i.e., the number of encoder pulses.

As shown in FIG. 13, since the clocks which are input to the read-out address counter 808 vary independence on the magnification, the dividing ratio is designated and the coordinate data is again calculated in accordance with the magnification (STP 505).

The count value which is set in the left margin counter 824 is decided in correspondence to the schedule in the slant mode, i.e., the number of encoder pulses. This count value is stored in the RAM 710.

On the other hand, the printer as an output unit of the present system has a plurality of sheet feeding cassette units and the sheets of various sizes can be simultaneously set to the printer. Therefore, when the automatic sheet feeding mode has been selected, the maximum length of the output image is calculated by the coordinate values and magnification which have been developed by the maximum length (STP 507). The sheet of the optimum size is selected from among the sheet cassettes set in the printer on the basis of the maximum lenth (STP 508).

In the slant mode, the relations among the sheet, the magnification, and the slant image can be expressed by the following expressions:

$$PX \geq XL \cdot MX \quad (1)$$

$$PY \geq YL \cdot MY + XL \cdot MX \cdot B/A \quad (2)$$

where

PX is length in the sub-scanning direction of the sheet,

XL is length in the sub-scanning direction of the original or designated area,

MX is magnification in the sub-scanning direction,

PY is length in the main scanning direction of the sheet,

YL is length in the main scanning direction of the original or designated area,

MY is magnification in the main scanning direction, and

B/A is the ratio of the number of pixels to be shifted to the number of lines based on the angle of slant image.

Namely, in the case of designating the automatic magnification mode, since MX and MY are not known, they are determined so as to satisfy the above expressions (the values of MX and MY are ordinarily the same). In addition, since PX and PY are not known in the automatic sheet feeding mode, the sheet of the size which is larger than PX and PY and is the nearest thereto is selected from among the sheet cassettes set in the printer on the basis of the above expressions.

Next, the necessary values are set in the respective registers shown in FIG. 13 (STP 509). A copy start instruction is output to the printer (STP 510). The motor to drive the optical system is actuated (STP 510). The encoder pulses are counted, and if it is determined (STP 512) that it is necessary to change the values set in the registers in the sub scanning direction, a check is made to see if the count value of the encoder pulses has reached a predetermined value or not. If YES, the value of the necessary register is changed (STP 513). Namely, in the case of the slant image, the count value which is set in the left margin counter 824 is sequentially changed in accordance with the schedule which was made in STP 504. If the reading position in the sub-scanning direction has reached the end of the original or sheet (STP 514), the optical system is returned to the home position and the motor is stopped (STP 515 and 516). A copy stop instruction is output to the printer (STP 517).

The image shifting operation in STP 513 will now be explained in detail.

In this embodiment, the shift angle is changed every 5° and can be set to an arbitrary value within a range of −85° to +85°. In this embodiment, the data with respect to the number of lines and the number of pixels which are shifted have previously been stored as a table in the ROM. When the angle has been designated by the operator as mentioned above, the number of lines and the number of moving dots of each line concerned with the designated angle are taken out of the table shown in FIG. 17 stored in the ROM 707 and are stored into the RAM 710. After the copying operation has been started, the image is moved every line by referring to the table.

Figure 16:
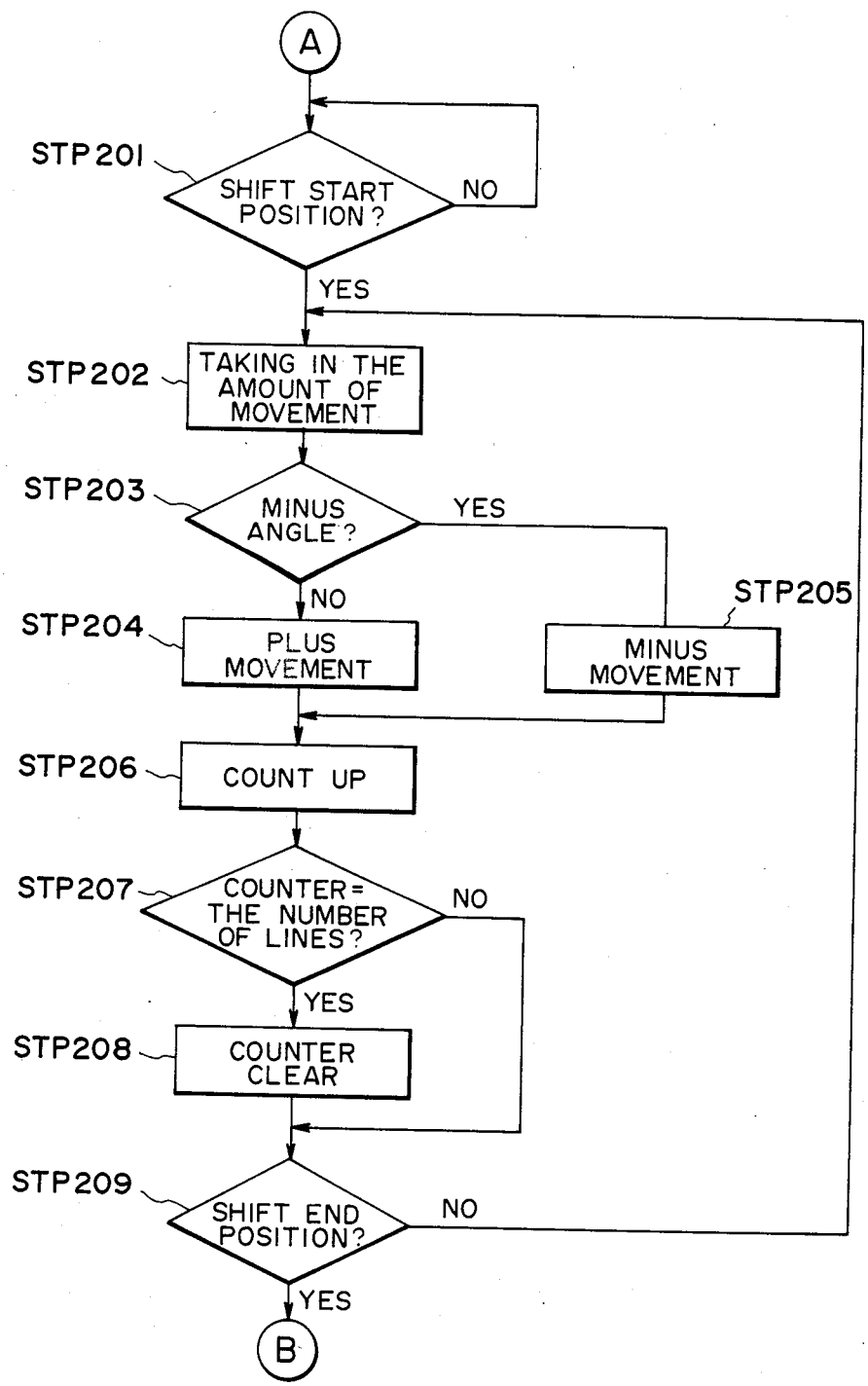
FIG. 16 is a flowchart showing the control for the shifting operation.

FIG. 16 shows a flowchart for the shifting operation and this operation will now be explained hereinbelow. When the angle has been designated, the number of lines corresponding to the angle and the number of dots to be moved every line are taken out of the table of FIG. 17 and are stored in the RAM 710 in STP 502 as explained above. At this time, if the angle of a minus value has been designated, the most significant bit in the RAM into which the number of lines is stored is set to "1". If the angle of a plus value has been designated, it is set to "0". On the basis of this bit, a decision regarding plus/minus, which will be explained hereinafter, is performed. After the optical system has reached the shift start position (STP 201), the amount of movement is taken in on the basis of the line number count value (STP 202). For example, in the case of 80° and the second line, "6" is taken in. Then, a check is made to see if the value of the angle is plus or minus on the basis of the foregoing plus/minus decision bit (STP 203). The position data which is set into the left margin counter 824 is increased or decreased (STP 204 and 205). The count value of the number of lines is counted up. The line number count value is compared with the set value of the line number area (STP 207). If the number of lines and the count value coincide, the line number counter is cleared. In this way, by sequentially repeating the table shown in FIG. 17, the image can be shifted by a desired angle. Next, a check is made to see if the optical system has been moved to the shift end position or not (STP 209). If the answer is NO, the processing routine is returned to STP 202.

As described above, since the count value which is set into the left margin counter 824 can be sequentially changed, the output position of the image can be sequentially changed in the main scanning direction by a simple construction and the image processing apparatus having the high level of functions is realized.

On the other hand, the microcomputer calculates the size of output image and the magnification and sheet size can be automatically selected, so that the operator can execute such high level of functions by simple operations.

As described above, with the construction of the second preferred embodiment of the invention, the count value of the counter to control the output position in the main scanning direction of the image can be sequentially changed and an arbitrary modified image output can be obtained.

Although the present invention has been shown and described with respect to the preferred embodiments, various changes and modifications which are obvious to a person skilled in the art to which the invention pertains are deemed to lie within the spirit and scope of the invention.

What is claimed is:

1. An image processing apparatus comprising:
   input means for inputting image signals representing an original image on a line by line basis;
   memory means for storing the image signals entered from said input means on a line unit basis, said memory means being such as to permit the image signals stored in said memory means to be read out from an arbitrary memory location on a line unit basis;
   image forming means for forming an image on a recording material on a line by line basis based on the image signals read out from said memory means on a line unit basis;
   setting means for setting a slant amount of an image to be formed, relative to the original image; and
   control means for changing a read-out start position of the image signals from said memory means each n lines, where n is a predetermined number, in accordance with the slant amount set by said setting means.

2. An image processing apparatus according to claim 1, wherein said input means comprises reading means for reading the original image on a line by line basis and generating the image signals.

3. An image processing apparatus according to claim 1, wherein said setting means is adapted to set the slant amount using a slant angle.

4. An image processing apparatus according to claim 1, wherein said control means is operable to determine a changing rate of the read-out start position of the image signals in accordance with the slant amount set by said setting means.

5. An image processing apparatus according to claim 1, wherein said control means is operable to change an address from which reading out of the image signal from said memory means is started.

6. An image processing apparatus according to claim 1, wherein said control means is operable to gradually change the read-out start position of the image signals.

7. An image processing apparatus according to claim 1, wherein n is 1.

8. An image processing apparatus according to claim 1, wherein n is greater than 1.

9. An image processing apparatus comprising:
   input means for inputting image signals representing an original image on a line by line basis;
   memory means for storing the image signals entered from said input means on a line unit basis, said memory means being such as to permit the image signals stored in said memory means to be read out therefrom in an arbitrary timing on a line unit basis;
   image forming means for forming an image on a recording material on a line by line basis based on the image signals readd out from said memory means on a line unit basis;
   setting means for setting a slant amount of an image to be formed, relative to the original image; and
   control means for changing a read-out start timing of the image signals from said memory means each n lines, where n is a predetermined number, in accordance with the slant amount set by said setting means.

10. An image processing apparatus according to claim 9, wherein said input means comprises reading means for reading the original image on a line by line basis and generating the image signals.

11. An image processing apparatus according to claim 9, wherein said setting means is adapted to set the slant amount using a slant angle.

12. An image processing apparatus according to claim 9, wherein said control means is operable to determine a changing rate of the read-out start timing of the image signals in accordance with the slant amount set by said setting means.

13. An image processing apparatus according to claim 9, wherein said control means is operable to change a time interval from a time when said image forming means starts the image formation to a time when the read-out start of the image signal from said memory means is carried out.

14. An image processing apparatus according to claim 9, wherein said control means is operable to gradually change the read-out start timing of image signals.

15. An image processing apparatus according to claim 9, wherein n is 1.

16. An image processing apparatus according to claim 9, wherein n is greater than 1.

17. An image processing apparatus comprising:
   input means for inputting image signals representing an original image on a line by line basis;
   memory means for storing the image signals entered from said input means on a line unit basis, said memory means being such as to permit the image signals stored in said memory means to be read out therefrom on a line unit basis;

image forming means for forming an image on a recording material on a line by line basis based on the image signals read out from said memory means on a line unit basis;

control means for changing a read-out start position or timing of image signals from said memory means each n lines, where n is a predetermined number of lines; and determining means for determining a size of the recording material, on which the image is to be formed, in accordance with a condition of the image formed by said image forming means.

18. An image processing apparatus according to claim 17, wherein said input means comprises reading means for reading the original image on a line by line basis and generating the image signals.

19. An image processing apparatus according to claim 9, further comprising setting means for setting a slant amount of an image to be formed, relative to the original image, wheren said control means is operable to change the read-out start position or timing in accordance with the slant amount set by said setting means.

20. An image processing apparatus according to claim 17, wherein n is 1.

21. An image processing apparatus according to claim 17, wherein n is greater than 1.

* * * * *

UNITED STATES PATENT AND TRADEMARK OFFICE
CERTIFICATE OF CORRECTION

PATENT NO. : 4,788,599

DATED : November 29, 1988

INVENTOR(S) : KIYOHISA SUGISHIMA

It is certified that error appears in the above-identified patent and that said Letters Patent is hereby corrected as shown below:

IN [57] ABSTRACT

Line 2, "to inputs" should read --inputs--.
Line 8, "circuit" should be deleted.

COLUMN 3

Line 55, "operration" should read --operation--.

COLUMN 4

Line 6, "a variation" should read --variation--.
  Line 7, "a fluctuation" should read --fluctuation--.

COLUMN 9

Line 13, "As" should read --An--.

COLUMN 10

Line 55, "tp" should read --to--.

COLUMN 13

Line 21, "calibration" should read --calculation--.

UNITED STATES PATENT AND TRADEMARK OFFICE
CERTIFICATE OF CORRECTION

PATENT NO. : 4,788,599

DATED : November 29, 1988

INVENTOR(S) : KIYOHISA SUGISHIMA

It is certified that error appears in the above-identified patent and that said Letters Patent is hereby corrected as shown below:

<u>COLUMN 16</u>

Line 30, "readd" should read --read out--.

Signed and Sealed this

Seventeenth Day of October, 1989

Attest:

DONALD J. QUIGG

Attesting Officer     Commissioner of Patents and Trademarks